United States Patent [19]
Kalotay

[11] Patent Number: 5,469,748
[45] Date of Patent: Nov. 28, 1995

[54] NOISE REDUCTION FILTER SYSTEM FOR A CORIOLIS FLOWMETER

[75] Inventor: Paul Z. Kalotay, Lafayette, Colo.

[73] Assignee: Micro Motion, Inc., Boulder, Colo.

[21] Appl. No.: 278,547

[22] Filed: Jul. 20, 1994

[51] Int. Cl.⁶ .................................................... G01F 1/68
[52] U.S. Cl. ...................... 73/861.38; 324/601
[58] Field of Search .......................... 73/861.37, 861.38, 73/861; 324/601

[56] References Cited

U.S. PATENT DOCUMENTS

| | | | |
|---|---|---|---|
| Re. 31,450 | 11/1983 | Smith | 73/861.38 |
| 4,109,524 | 8/1978 | Smith | 73/194 B |
| 4,491,025 | 1/1985 | Smith | 73/861.38 |
| 4,879,911 | 11/1989 | Zolock | 73/861.38 |
| 5,228,327 | 7/1993 | Bruck | 73/3 |
| 5,231,884 | 8/1993 | Zolock | 73/861.38 |
| 5,331,859 | 7/1994 | Zolock | 73/861.38 |
| 5,343,761 | 9/1994 | Myers | 73/861 |

Primary Examiner—Hezron E. Williams
Assistant Examiner—Harshad Patel
Attorney, Agent, or Firm—Duft, Graziano & Forest

[57] ABSTRACT

A noise reduction system and method for measuring the phase difference between output signals of a Coriolis flowmeter. The output signals are applied to signal processing circuitry having three measurement channels, each of which includes a multi-pole filter having a relatively large phase shift. A channel pair is alternately switched in successive time intervals between a calibration status and an active status. In the calibration status, the two channels are connected during one time intervals to the same input signal and the output signals of the two channels are measured to determine the inherent phase delay between the two calibration channels. The two channels are then switched during the next time interval to an active status in which they are connected separately to the two output signals from the flowmeter. The output signals of the channels are then measured and the resultant measured phase delay is algebraically combined with the phase delay measured during the calibration status to determine the true phase delay between the two signals received from the Coriolis flowmeter.

11 Claims, 2 Drawing Sheets

NOISE REDUCTION FILTER SYSTEM FOR A CORIOLIS FLOWMETER

FIELD OF THE INVENTION

This invention relates to a filter system and more particularly to a noise reduction filter system for a Coriolis flowmeter.

PROBLEM

It is known to use Coriolis effect mass flowmeters to measure mass flow and other information for materials flowing through a conduit. Such flowmeters are disclosed in U.S. Pat. Nos. 4,109,524 of Aug. 29, 1978, 4,491,025 of Jan. 1, 1985, and Re. 31,450 of Feb. 11, 1982, all to J. E. Smith et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected conduit on the inlet side of the flowmeter, is directed through the flow tube or tubes, and exits the flowmeter through the outlet side. The natural vibration modes of the vibrating, fluid filled system are defined in part by the combined mass of the flow tubes and the material within the flow tubes.

When there is no flow through the flowmeter, all points along the flow tube oscillate with identical phase due to an applied driver force. As material begins to flow, Coriolis accelerations cause each point along the flow tube to have a different phase. The phase on the inlet side of the flow tube lags the driver, while the phase on the outlet side leads the driver. Sensors are placed on the flow tube to produce sinusoidal signals representative of the motion of the flow tube. The phase difference between two sensor signals is proportional to the mass flow rate of material through the flow tube.

A complicating factor in this measurement is that the density of typical process fluids varies. Changes in density cause the frequencies of the natural modes to vary. Since the flowmeter's control system maintains resonance, the oscillation frequency varies in response to changes in density. Mass flow rate in this situation is proportional to the ratio of phase difference and oscillation frequency.

The above-mentioned U.S. Pat. No. Re. 31,450 to Smith discloses a Coriolis flowmeter that avoids the need for measuring both phase difference and oscillation frequency. Phase difference is determined by measuring the time delay between level crossings of the two sinusoidal signals of the flowmeter. When this method is used, the variations in the oscillation frequency cancel, and mass flow rate is proportional to the measured time delay. This measurement method is hereinafter referred to as a time delay or $\Delta t$ measurement.

Information regarding the characteristics of material flowing in a Coriolis mass flowmeter is typically derived by instrumentation which measures the phase or time delay between two output signals of the sensors of the flowmeter. These measurements must be made with great accuracy since this is often a requirement that the derived flow rate information have an accuracy of at least 0.15% of reading. These flowmeter output signals are sinusoidal and are displaced in time or phase by an amount determined by the Coriolis forces generated by the meter through which the material flows. The signal processing circuitry which receives these sensor output signals measures this phase difference with precision and generates the desired characteristics of the flowing process material to the required accuracy of at least 0.15% of reading.

In order to achieve these accuracies, it is necessary that the signal processing circuitry operate with precision in measuring the phase shift of the two signals it receives from the flowmeter. Since the phase shift between the two output signals of the meter is the information used by the processing circuitry to derive the material characteristics, it is necessary that the processing circuitry not introduce any phase shift which would mask the phase shift information provided by the meter output signals. In practice, it is necessary that this processing circuitry have an extremely low inherent phase shift so that the phase of each input signal is shifted by less than 0.001° and, in some cases, less than a few parts per million. Phase accuracy of this magnitude is required if the derived information regarding the process material is to have an accuracy of less than 0.15%.

The frequencies of the Coriolis flowmeter output signals fall in the frequency range of many industrially generated noises. Also, the amplitude of the meter output signals is often small and, in many cases, is not significantly above the amplitude of the noise signals. This limits the sensitivity of the flowmeter and makes the extraction of the useful information quite difficult.

There is not much a designer can do either to move the meter output signal frequency out of the noise band or to increase the amplitude of the output signal. Practical Coriolis sensor and flowmeter design requires compromises that result in the generation of an output signal having a less than optimum signal to noise ratio and dynamic range. This limitation determines the flowmeter characteristics and specifications including the minimum and maximum flow rates which may be reliably derived from the flowmeter's output signals.

The magnitude of the minimum time delay that can be measured between the two Coriolis flowmeter output signals at a given drive frequency is limited by various factors including the signal to noise ratio, the complexity of associated circuitry and hardware, and economic considerations that limit the cost and complexity of the associated circuitry and hardware. Also, in order to achieve a flowmeter that is economically attractive, the low limit of time delay measurement must be as low as possible. The processing circuitry that receives the two output signals must be able to reliably measure the time delay between the two signals in order to provide a meter having the high sensitivity needed to measure the flowing characteristics of materials having a low density and mass such as, for example, gases.

There are limitations regarding the extent to which conventional circuit design can, by itself, permit accurate time delay measurements under all possible operating conditions of a Coriolis flowmeter. These limitations are due to the inherent noise present in any electronic equipment including the imperfections of semi-conductor devices and noise generated by other circuit elements. These limitations are also due to ambient noise which similarly limits the measurement can be reduced to some extent by techniques such as shielding, guarding, grounding, etc. Another limitation is the signal to noise ratio of the sensor output signals themselves.

Good circuit design can overcome some of the problems regarding noise in the electronic equipment as well as the ambient noise in the environment. However, an improvement in the signal to noise ratio of the output signals cannot be achieved without the use of filters. But filters alter the amplitude and phase of the signals to be processed. This is undesirable, since the time delay between the two signals is the base information used to derive characteristics of the process fluid. The use of filters having unknown or varying amplitude and/or phase characteristics can unacceptably alter the phase difference between the two sensor output signals and preclude the derivation of accurate information of the flowing material.

The flowmeter's drive signal is typically derived from one of the pick-off output signals after it is conditioned, phase shifted and used to produce the sinusoidal drive voltage for the drive coil of the meter. This has the disadvantage that harmonics and noise components present in the pick-off signal are amplified and applied to the drive coil to vibrate the flow tubes at their resonant frequency. However, an undesirable drive signal can be generated by unwanted mechanical vibrations and electrical interferences that are fed back to the meter drive circuit and reinforced in a closed loop so that they create relatively high amplitude self-perpetuating disturbing signals which further degrade the precision and accuracy of the time delay measurement.

A successful technique to reduce some of the above problems is described in U.S. Pat. No. 5,231,884 to M. Zolock and U.S. Pat. No. 5,228,327 to Bruck. These patents describe Coriolis flowmeter signal processing circuitry that uses three identical channels having precision integrators as filters. A first one of these channels is permanently connected to one pick-off signal, say, for example, the left. The other two channels (second and third) are alternately connected in successive time intervals, one at a time, to the right pick-off signal. When one of these, say the second channel, is connected to the right pick-off signal, the third channel is connected, along with the first channel, to the left pick-off signal. The inherent phase delay between the first and third channel is measured during a first time interval by comparing the time difference between the outputs of the two channels now both connected to the left signal. Once this characteristic delay is determined, the role of this third channel and the second channel connected to the right pick-off signal is switched during a second time interval. In this new configuration, the second channel undergoes a calibration of its delay characteristics while the third calibrated channel is connected to the right pick-off signal. The roles of second and third channels are alternately switched by a control circuit approximately once every minute. During this one-minute interval (about 30 to 60 seconds), aging, temperature, and other effects have no meaningful influence on the phase-shift of the filters and therefore their phase relationship is known and considered defined.

The precisely calibrated integrators used by Zolock provide a signal to noise ratio improvement amounting to about 6 db/octave roll-off in the amplitude transfer function of the integrator. Unfortunately, this 6 db/octave improvement is not enough under many circumstances in which Coriolis flowmeters are operated. The reason for this is that a single-pole filter, such as the Zolock integrator, has a relatively wide band width. As a result, noise signals generated by unwanted flow tube vibration modes, noisy environment, material flow noise, electromagnetic or radio frequency interference and disturbances are not removed to the extent necessary for high meter sensitivity required for precision. Depending on their frequency, their amplitude is reduced somewhat, but they can still interfere with the precision time delay measurement between the two pick-off output signals when measuring low mass materials such as gases.

There is another source for errors in the Zolock and Bruck system. The integrator time delay measurements are made at three (3) certain well defined points of the sinusoidal pick-off signals. The two pick-off signals are ideal only when their shape is the same and is symmetrical around their peak values. However, when the two magnetic circuits (sensors) that generate the pick-off signals are not identical, the resulting non-ideal wave forms contain different amounts of harmonics with possibly undefined phase conditions which can alter their shape and potentially change their symmetrical character. The result of such variations is such that when, during normal operations, a Zolock integrator is calibrated with one wave form and is subsequently used to measure another wave form, the difference in wave forms may produce an undefined and unknown amount of error due to its harmonic content and its undefined and varying phase of its harmonics.

There are techniques currently available, such as digital signal processing and filtering, to overcome the above-discussed problems and simultaneously improve the signal to noise ratio of the signals being processed. However, these alternatives are complicated, expensive, and in most cases require design compromises that render their use less than ideal. It can therefore be seen that it is a problem to process the output signals of Coriolis flowmeters by circuitry that maintains the original phase shift between the two output signals and that by itself does not generate any unknown and unwanted phase shifts or other signal alterations which could degrade the accuracy of the output information generated by the processing circuitry regarding the characteristics of the material flowing through the flowmeter.

SOLUTION

The above problems are solved and an advance in the art is achieved by the present invention which provides additional and improved filtering apparatus and methods for Coriolis flowmeter output signal processing circuitry that uses the techniques of Zolock and Bruck. The integrating amplifiers of Zolock are relatively broad band 6 db/octave type filters that are primarily effective to filter out frequencies substantially higher than that of the meter output signals while maintaining a precise amount of phase shift influenced only by minor component variations. Since they are not of the sharp cut-off type, they are not effective in reducing and eliminating noise signals having a frequency close to that of the meter output signals. Thus, even though the Zolock self-calibrating feature eliminates errors due to long-term phase shift, the undesirable noise signals immediately adjacent the frequency of the process signals remain in the output of the Zolock circuit.

In accordance with my invention, I provide a multi-pole filter, such as a filter having eight or more poles, ahead of the precision integrators of the Zolock type. Since my filters are of the multi-pole type, they have a sharp roll-off characteristic and provide a narrow pass band that effectively eliminates all noise signals having a frequency near that of the processed flowmeter pick-off signals. The use of my multi-pole filters with the Zolock circuitry permits better filtering of undesirable signals so that the processed Coriolis pick-off signals have significantly reduced undesirable noise components. These signals can therefore be processed to generate information of improved precision regarding various characteristics of the process material.

Even with the use of my multi-pole filter, it is still necessary to meet the requirement of less than 0.001° of phase shift stability so that the time delay between the two pick-off signals can be measured with required precision. My multi-pole filters may have an undefined and unknown phase shift that can amount to several hundred degrees or more. Normally, it might present a problem to insert a filter having a large, and unknown phase shift of several hundred degrees or more into a circuit that measures the time difference between two signals to an accuracy of 0.001° or better. However, the phase shift of my multi-pole filters, although large and undefined, is relatively constant over a period of a few minutes. The Zolock system performs its customary channel switching and calibration so that any errors due to phase shifts between channels are effectively canceled.

The use of my multi-pole sharp cutoff filters into the Zolock system permits the resultant system to have a very high db/octave roll-off characteristics so as to constitute a sharp cut-off filter that eliminates substantially all unwanted noise from the pick-off signals being processed. The phase shift of my multi-pole filters do not present a problem since they change slowly only over a relatively long period of time, as active and passive components age. Any phase shift is detected once per minute by the Zolock calibration circuitry as the status of the switchable channels is changed during each successive interval from active to stand-by to calibrate and vice-versa.

Another advantage of my invention is that the drive circuit can utilize a filtered pick-off signal from which undesirable components have been removed by the filtering provided in accordance with my invention. The resulting improved sinusoidal drive signal does not in itself excite and generate further undesirable modes that can contribute to noisy pick-off signals.

DESCRIPTION OF THE DRAWINGS

These and other advantages and features of the invention can be better understood from a reading of the following description thereof taken in conjunction with the drawing in which.

DETAILED DESCRIPTION

Figure 1:
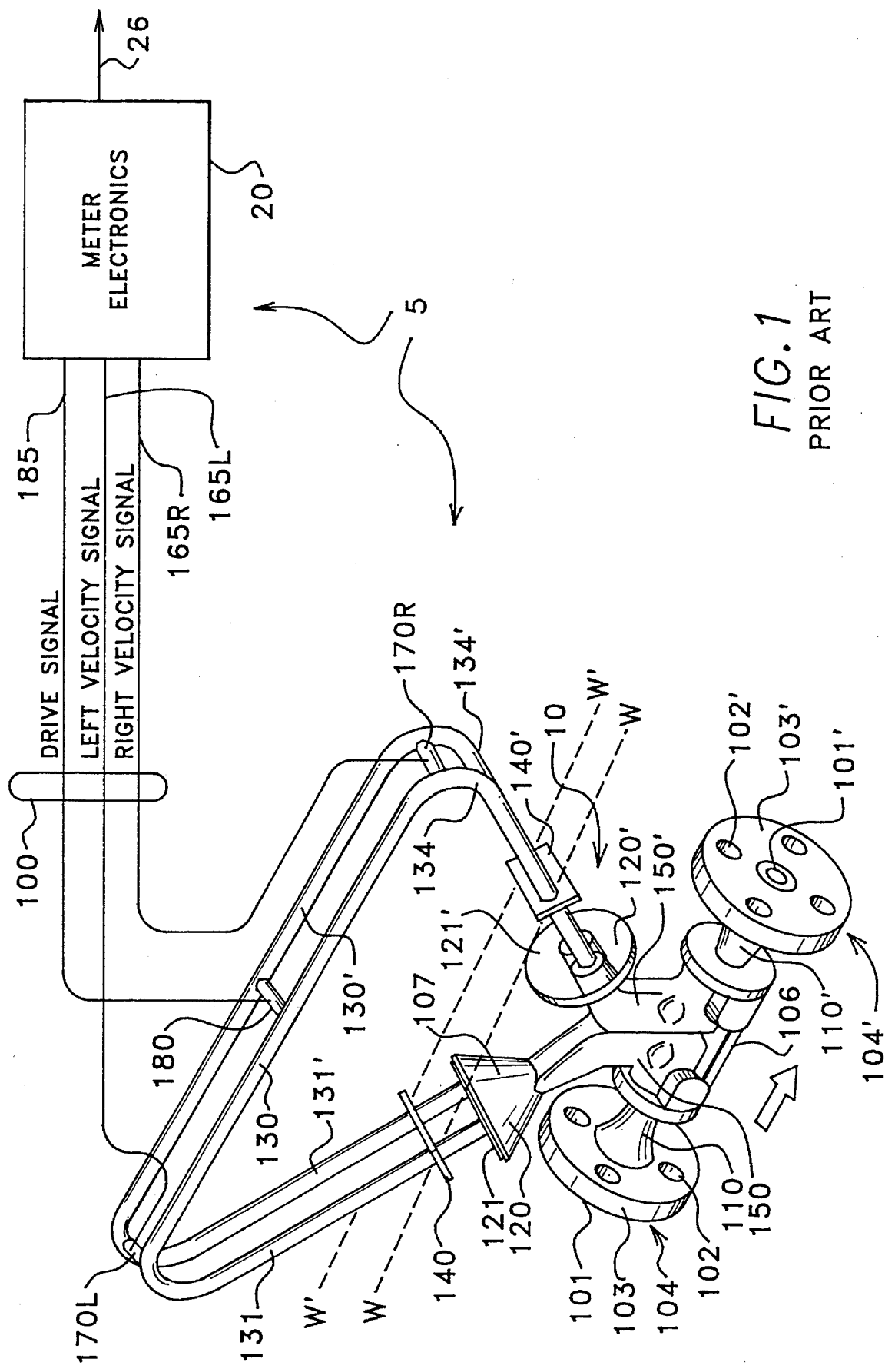
FIG. 1 discloses the invention embodied in a Coriolis material flow measurement system.

FIG. 1 shows a Coriolis meter assembly 10 and meter electronics 20. Meter electronics 20 are connected to meter assembly 10 via leads 100 to provide density, mass flow rate, volume flow rate and totalized mass flow information to path 26.

Meter assembly 10 includes a pair of tubular members 110 and 110', manifolds elements 150 and 150', a pair of parallel flow tubes 130 and 130', drive mechanism 180, and a pair of velocity sensors 170L and 170R. Flow tubes 130 and 130' have two essentially straight inlet legs 131 and 131' and outlet legs 134 and 134' which converge towards each other at elements 120 and 120' having surfaces 121 and 121'. Brace bars 140 and 140' define the axis W and W' about which each flow tube oscillates.

The side legs 131 and 134 of flow tubes 130 and 130' are fixedly attached to surfaces 121 and 121' of elements 120 and 120' which, in turn, are attached to manifold members 150 and 150'. This provides a continuous closed material path through Coriolis meter assembly 10. When meter assembly 10 having flange 103 and 103' and fluid openings 101 and 101' are connected, via outlet end 104' and outlet end 104' to a flow tube system (not shown) which carries the process material to be measured, material enters the meter through fluid opening 101 in flange 103 of inlet end 104 is extended through inlet manifold 110 and a passageway therein having a gradually changing cross-section to element 120 having a surface 121. There, the material is divided and routed through legs 131 and 131' and flow tube elements 130 and 130'. Upon exiting flow tubes 130 and 130' and legs 134 and 134', the process material is recombined in a single stream within element 120' having a surface 121 and is thereafter routed to exit manifold 150. Within exit manifold 150, the material flows through a passageway having a similar gradually changing cross-section to that of inlet manifold 150 to fluid opening 101' in outlet end 104'. Outlet end 104' is connected by flange 103' having bolt holes 102' to a conduit system (not shown).

Flow tubes 130 and 130' are selected and appropriately mounted to elements 120 and 120' so as to have substantially the same mass distribution, moments of inertia and elastic modulus about bending axes W—W and W'—W', respectively. These bending axes are located near respective flow tube brace bars 140 and 140' and elements 120 and 120'. Brace Bars 140 and 140' together with axes W and W' comprise the out-of-phase bending axes for flow tubes 130 and 130' as they are driven out of phase by driver 180. Manifold elements 120 and 120' comprise the in-phase bending axis for flow tubes 130 and 130'. The flow tubes may be vibrated in-phase by disturbances from the environment such as earthquakes, human activity, movements caused by adjacent machinery, etc. The flow tubes extend outwardly from the mounting blocks in an essentially parallel fashion and have substantially equal mass distributions, moments of inertia and elastic modules about their respective bending axes.

Both flow tubes 130 are driven by driver 180 in opposite directions about their respective bending axes W and W' at what is termed the first out-of-phase natural frequency of the flowmeter. This mode of vibration is also referred to as an out-of-phase bending mode. Both flow tubes 130 and 130' vibrate out of phase as the tines of a tuning fork. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Drive element 180 and the generated Coriolis forces cause a Coriolis oscillation of flow tubes 130 in a periodic manner. During the first half of the Coriolis oscillation period of the flow tubes 130, the adjacent side legs 131 and 131', are forced closer together than their counterpart side legs 134 and 134', and reach the end point of their travel where their velocity reaches zero before their counterparts do so. In the second half of the Coriolis oscillation period, the opposite relative motion of the flow tubes 130 occurs, i.e., adjacent side legs 134 and 134', are forced closer together than their counterpart side legs 131 and 131'. Therefore, legs 134 reach the end point of their travel where their velocity crosses zero before legs 131 do so. This time interval (also referred to herein as the phase difference at a particular frequency, or time delay difference, or simply "$\Delta t$" value) which elapses from the instant one pair of adjacent side legs reaches their end point of travel to the instant the counterpart pair of side legs (i.e., those forced further apart), reach their respective end point, is substantially proportional to the mass flow rate of the material flowing through meter assembly 10. The end points of travel of the respective flow tubes is a convenient point to make the $\Delta t$ measurement. The same $\Delta t$ relationship between the two flow tubes exists throughout the entire range of motion of the flow tubes.

To measure the time delay interval, Δt, sensors 170L and 170R are attached to flow tubes 130 and 130' near their free ends. The sensors may be of any well-known type. The signals generated by sensors 170L and 170R provide a velocity (or displacement or acceleration) profile of the complete travel of the flow tubes and can be processed by any one of a number of well known methods to compute the time interval and, in turn, the mass flow rate of the material passing through the meter.

Sensors 170L and 170R produce the left and right velocity signals that appear on leads 165L and 165R, respectively. The time delay difference, or Δt, measurement provides a manifestation of the phase difference that occurs between the left and right velocity sensor signals.

Meter electronics 20 receives the left and right velocity output signals appearing on leads 165L and 165R, respectively. Meter electronics 20 produces the drive signal appearing on lead 185 to drive element 180 which vibrates tubes 130 and 130'. Meter electronics 20 processes the left and right velocity signals to compute the mass flow rate, volume flow rate and the density of the material passing through meter assembly 10.

The characteristics of the process material flowing in the flowmeter 10 is derived by meter electronics 20 which measures the phase or time delay Δt between the two sensor output signals 165L and 165R. These time delay measurements must be made with great accuracy. It is a requirement that the derived flow output information for the process material have an accuracy of at least 0.15% of rate when applied to output conductor 26 of meter electronics 20.

In order to attain these output signal accuracies, it is necessary that the signal processing circuitry within meter electronics 20 determine with precision the phase difference between the sensor output signals. Since the phase difference between the sensor output signals comprises the input information upon which the processing circuitry operates to derive the process material information, it is necessary that the signal processing circuitry within meter electronics 20 not introduce any phase shift which would mask or alter the phase shift between the sensor output signals from the flowmeter. It is necessary that this signal processing circuitry have a constant or an extremely stable phase shift so that the phase of the sensor signals 165R and 165L is shifted by less than 0.001 degree and, in some cases, less than a few parts per million. Phase accuracy of this magnitude is required if the meter electronics 20 is to attain an accuracy of less than 0.15% for the signals it applies to its output conductor 26.

Figure 2:
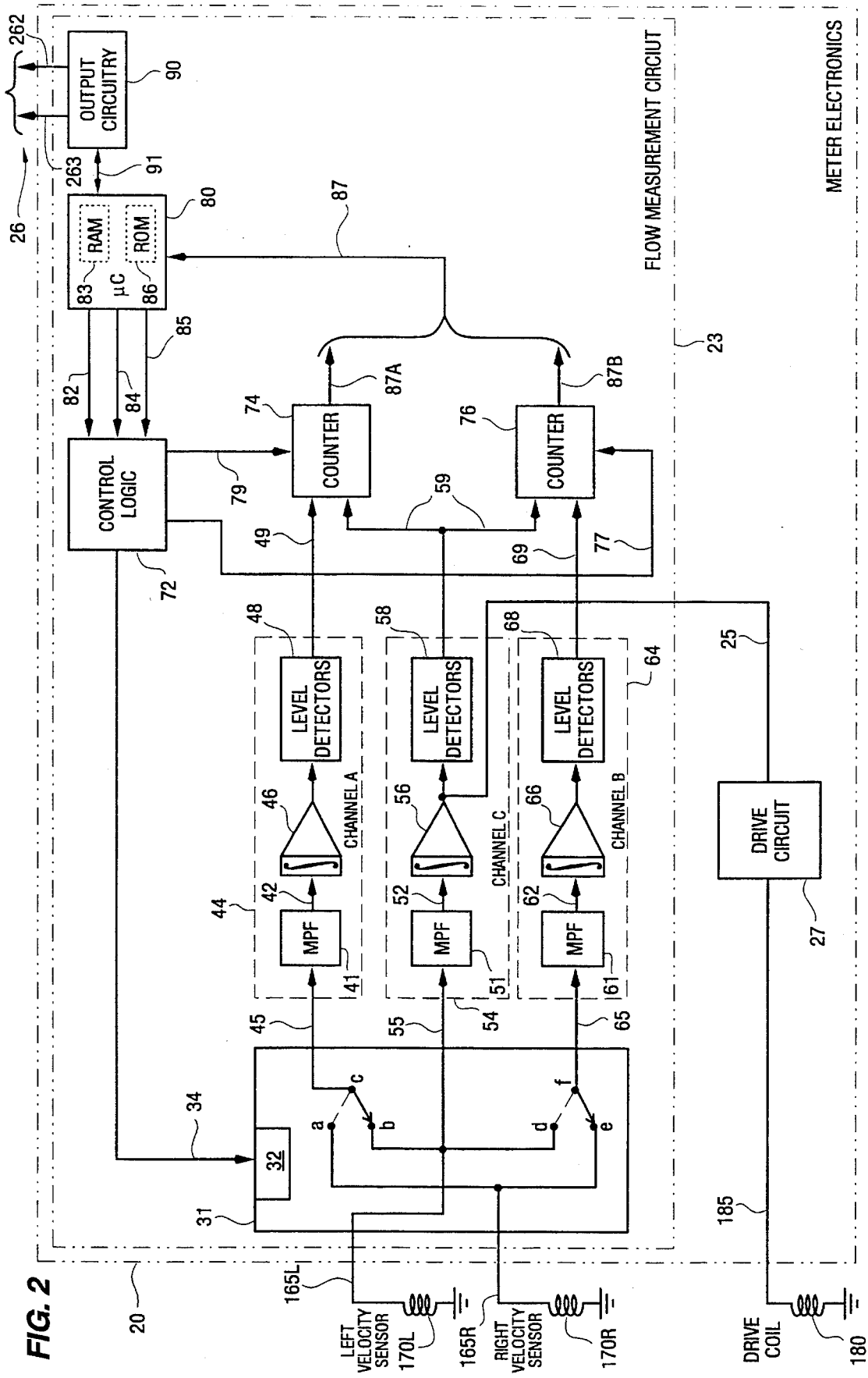
FIG. 2 discloses further details of the meter electronics element of FIG. 1.

Description of FIG. 2

FIG. 2 discloses the circuitry comprising the meter electronics 20 of FIG. 1. As shown, meter electronics 20 comprises a drive circuit 27 which is connected to drive coil 180 by path 185. Drive circuit 27 applies the appropriate signals to path 185 to energize drive coil 180 at the proper amplitude and frequency to produce the desired out-of-phase bending vibrations to the: flow tubes 130 and 130'. Circuit 27 is well known in the art and since its specific implementation does not form any part of the present invention, it is not further discussed in detail herein. However, the reader is referred to U.S. Pat. No. 5,009,109 issued to P. Kalotay, et al. on Apr. 23, 1991; U.S. Pat. No. 4,934,196 issued to P. Romano on Jun. 19, 1990; and U.S. Pat. No. 4,876,879 issued to J. Ruesch on Oct. 31, 1989. All of these are owned by the present assignee of the present invention and describe different embodiments for a flow tube drive circuit.

Meter electronics 20 also comprises flow measurement circuit 23 which on its left is connected to sensors 170L and 170R over paths 165L and 165R to receive the sensor output signals. It is the phase difference between these two sensor output signals that comprises the input information measurement circuit 23 receives and processes to derive accurate information regarding the process material. Input signals 165L and 165R are applied to multiplexer 31 whose output is connected over paths 45, 55 and 65 to inputs of channels 44, 54 and 64, respectively (channels A, C and B). The channels operate in the manner subsequently described to process the sensor signals and control the operation of counters 74 and 76 whose outputs represent the phase difference between the sensor output signals.

The outputs of counters 74 and 76 are applied over path 87 to microprocessor 80 which functions in the manner subsequently described to derive the desired information for the process material. The derived information is applied over path 91 to output circuitry 90 which applies the desired process material output information to its conductor 26 via conductors 263 and 262. The operation of the counters 74 and 76, as well as multiplexer 31, is controlled as subsequently described by control logic 72.

Each of channels A, B, and C contains a multi-pole filter, an integrating amplifier, and at least one level detector. The output of the multi-pole filter in each channel is applied to the integrating amplifier of the channel whose output, in turn, is applied to a level detector whose outputs are applied to counters 74 and 76 which measure the timing interval in terms of clock pulses that occur between corresponding changes in the detector outputs. The counter output is the well-known Δt value and varies with the mass flow rate of the processing fluid. The resulting Δt value and counts are applied to microprocessor 80 over path 87 which responds to this information, computes mass and volumetric flow rates and density, and generates the desired output information concerning the process material.

The circuitry contained within channels 44, 54 and 64 can inject phase error into the mass flow information generated by processor 80. The circuitry of each channel not only possesses a different amount of internal phase delay as measured from the input of the multi-pole filter to the output of the level detectors, but the phase delay is temperature dependent and often varies from one channel to the other with temperature, aging, etc. This variation results in an uncontrolled interchannel phase difference that can manifest itself as an error component in the measured Δt value of input signals 165L and 165R. Because the Δt value of those signals is relatively small, any phase error introduced by channel circuitry can be significant.

To eliminate the deficiencies associated with the channel circuitry, the circuitry of FIG. 2 extends the teachings of the aforementioned Zolock U.S. Pat. No. 5,231,884, which is incorporated by reference herein to the same extent as if fully disclosed herein. The circuitry of FIG. 2 of the present application embodies much of the teachings of Zolock and, in particular, FIG. 3-A and 3-B of the Zolock patent. FIG. 2 embodies a technique that renders the mass flow and mass flow rate values produced by the meter substantially insensitive to phase errors induced by the processing circuitry of the channels A, B, and C of FIG. 2. This circuitry does not introduce any unwanted phase shifts that could mask the phase shift information provided by the sensor outputs over paths 165L and 165R. The phase shift information received by the flow measurement circuit 23 on paths 165L and 165R is processed with high accuracy and without the introduction of unwanted phase shifts by the channel circuitry. As a result, the processed meter outputs as applied by counters 74 and 76 over path 87 to microprocessor 80 represent the same phase shift information that is received from the meter on paths 165L and 165R. This allows the microprocessor 80 to derive accurate information for the processed material flowing in the tubes of the flowmeter.

The circuitry of FIG. 2 causes the inherent phase shift in the three channels, A, B, and C, to be measured and effectively canceled. Multiplexer 31 connects the two outputs of the flowmeter on paths 165L and 165R to be applied to inputs of two of the three channels at a time. Channel C is permanently connected to path 165L. The inputs of the other two channels, A and B, are alternately connected, one at a time during successive time intervals, to path 165R. In the position shown on FIG. 2, the right sensor output 165R is connected by movable switch contacts f and e, to the input of channel B over path 65. These switch contacts change position subsequently during the next time interval so that contacts f and d connect 165L to the input of channel B on path 65. A switchable channel, such as B, when it is connected to path 165R is termed the active channel. The other switchable channel, channel A, when it is connected to path 165R is termed the active channel. A switchable channel A or B is said to be in a calibration state when switchably connected to path 165L to which channel C is permanently connected.

The outputs of the three channels A, B, and C are connected via conductors 49, 69 and 59 to the inputs of counters 74 and 76. By these paths counter 74 receives input signals from the outputs of channels A and C while Counter 76 receives signals from the outputs of channels C and B. This enables counter 74 to measure the phase delay between the output signals of channels A and C. Similarly, counter 76 measures the phase delay between the outputs of channels B and C. The inherent phase delay between channels B and C, when channel B is in a calibration state, is measured by connecting the input of channel B to path 165L via switch contacts f and d, and by applying the outputs of channels B and C to counter 76 which measures the phase difference between the outputs of channels B and C. Since both channels are connected to the same input, the phase difference now measured between the output signals of channels B and C is due to the internal circuit elements of the two channels. The inherent phase delay between channels A and C is measured in a similar manner when the input of channel A is connected via switch contacts c and b through input path 165L. The phase difference between the outputs of the two channels on paths 49 and 59 are measured by counter 74. The phase differences measured by counters 74 and 76 when their associated channel A or B is in a calibration state is transmitted over path 87 to RAM 83 of microprocessor 80. This calibration information is stored for the time being in RAM 83.

In this manner the phase of each inactive channel is measured by comparing its output with the output of channel C. Subsequently, when an inactive channel is subsequently switched to an active status in the next time interval, its inherent phase delay, which is now stored in RAM 83, is combined algebraicly with the output information of its associated counter 74 and 76 to determine the true phase delay between the two input signals 165L and 165R.

For a time interval in which channel A is active, the output of counter 74 represents a phase difference between signals 165L and 165R as well as phase error due to the inherent phase shift between channels A and C. However, the inherent phase delay of the active channel A with respect to channel B is a known factor and is stored in RAM 83.

Microprocessor 80 now receives over path 87 the measured phase delay from counter 74. The measured phase delay from counter 74 is algebraically added to the phase delay correction factor from RAM 83 so that microprocessor 80 combines the two to obtain the true phase delay information representing only the phase delay between signals 165L and 165R. Channel B operates in a similar manner with respect to its counter 76. In so doing, counter 76 enters the calibration phase delay information for channel B in RAM 83 when channel B is in a calibration status and to determine the phase difference between signals 165L and 165R for a time interval in which channel B is in an active status. The two signals are then combined by microprocessor 80 to determine the true phase difference between signals 165L and 165R when channel B is active.

Channel B operates in a similar manner with respect to its counter 76 to store calibration phase delay information for channel B in RAM 83 when channel B is in a calibration status and to determine the true phase difference between signals 165L and 165R when channel B is in an active status.

Since each of the channel pairs change state approximately once per minute, the current phase delay information from counters 74 and 76 combined reflect the phase information provided by sensor output signals 165L and 165R. Because the Δt value based measurements provided by each active channel pair are corrected for the current internal phase delay associated with the active channel, these Δt values do not contain any appreciable channel induced phase errors.

In summary, the flow measurement circuit of FIG. 2 utilizes the three channels A, B and C by means of which inter-channel phase difference measurements to be separately derived for each of the two active pairs of channels; such as, for example, channels A and C, and B and C. Channels A and B are termed the switched channels. Channel C is always connected to path 165L and may be termed the reference channel. Path 165L is connected by multiplexer 31 to the input of channel A during one time interval, and then to the input of channel B during the next time interval. During the interval time that a channel, such as, for example, channel B, is in what is termed a calibration status and not connected to path 165R, its input is connected in parallel with the input of channel C to path 165L. The phase difference between channel C and channel B is measured during this calibration time interval. The outputs of channels C and B are connected to the input of counter 76 whose output represents the phase delay between the outputs of channels B and C.

All three channels may possess different and non-constant internal phase delays. Nevertheless, since the phase delay for channels A and B is measured with respect to the referenced channel C, any difference in the phase delay between channels A–C and B–C is known. Once the calibration time interval for a channel, such as channel B, is terminated, the input to channel B is switched during the next interval so that it is the active channel. At that time channel A becomes the calibration channel and its input is connected so that it is effectively in parallel with the input of channel C and connected at that time to path 165L.

When one pair of channels, such as B and C, is in the calibration mode, the other pair of channels, A and C, is in the measurement mode and measures the phase difference between the signals on paths 165L and 165R. For any channel pair, the measured Δt value of the input signals 165L and 165R that is obtained at the output of a counter, such as counter 74, is corrected by algebraicly combining the measured Δt value with the priorly measured inherent phase delay information for the same two channels now stored in RAM 83.

The two counters 74 and 76 switch status along with the channels once per time interval, such as once per minute. Thus, for a time interval in which channel A is active and connected to path 165R, counter 74 is the active counter and its inputs are connected to the output of channels A and C. At that time, channel B is the calibration channel and counter 76 is the calibration counter since its inputs are connected to the outputs of channels B and C to measure the inherent phase difference between the two channels. Subsequently, during the next time interval when the status of channels A and B switch so that B is the active channel, counter 76 is the active counter since its inputs are connected to the outputs of channels B and C to measure the phase difference between the signals on paths 165L and 165R. Counter 74 is then the calibration counter since its inputs are connected to the outputs of channels A and C whose inputs are both connected at that time via multiplexer 31 to path 165L. The output of counter 74 at that time represents the inherent phase difference between channels A and C, while the output of counter 76 represents the phase difference between the flowmeter's signals 165L and 165R together with any phase difference error due to inherent phase differences between channels B and C which are then the active channels. However, this inter-channel phase difference was priorly measured in the preceding time interval with this error information being stored within the RAM 83 of microprocessor 80. When microprocessor 80 receives the phase difference information from counter 74, it algebraically compensates the measured phase difference information with the calibration phase difference stored in RAM 83 to eliminate any error due to inter-channel phase differences. This permits the microprocessor to derive processed material information based upon only the phase difference between 165L and 165R signals received from the flowmeter.

Each of the channels contains a multi-pole filter, an integrating amplifier, and a level detector. For channel A, these elements comprise multi-pole filter 41, integrating amplifier 46, and level detector 48. The multi-pole filter may be of any high order type to provide a relatively sharp filter whose corner frequency is slightly above the frequency of the sensor output signals. However, the cut-off characteristics of the filter are sufficiently sharp so that noise signals above or below the frequency of the sensor's signals are greatly attenuated. The multi-pole filter may comprise either active or passive elements and may have a phase shift that is undetermined, but it may be in the order of several hundred degrees. No effort is made to control the long-term drift of the phase shift of the multi-pole filter. However, its short-term phase performance, say for a few minutes, is relatively stable, and does not vary significantly. The output of multi-pole filter is applied to an integrating amplifier 46 which is a single-pole filter having a 6 db per octave slope. This integrating amplifier 46 is used primarily as a means of eliminating any dc offset in the signal that may be on conductor 42 interconnecting multi-pole filter 41 and integrating amplifier 46. This elimination of any dc offset on the output of the integrating amplifiers necessary in order to provide for the accurate operation of the level detector element 48.

Level detector element 48 is effectively a windowing comparator that provides a level change on its output whenever the output signal produced by the integrating amplifier increases above or decreases below a fixed positive and a fixed negative voltage.

Each of the channels A, B and C provides essentially the same function. However, with respect to channel C, its level detector 58 contains a single level detector rather than a windowing comparator to detect whenever the output signal from integrating amplifier 56 crosses the zero voltage level.

Control logic 72 controls the operation of counters 74 and 76, as well as the switching function of multiplexer 31. Element 72 is a finite state machine that defines the periodic and repetitively occurring sequence of timing intervals and accompanying states. In accordance with the scientific notation commonly used in the disciplines of mathematics, physics, etc., these intervals may be defined as a sequence of - - - , n−1,n,n+1, - - - intervals. Control logic 72 operates in cooperation with counters 74 and 76 to determine the timing measurement for the channel pairs A–C and B–C, respectively. Control logic 72 is formed of well-known combinatorial and other logic. After having been initialized with the duration in flow tube cycles of the calibration and switching intervals, control logic 72 generates and applies signals over path 34 to operate multiplexer 31 via its control elements 32 to route sensor 170R signals over path 165R to the inputs of either channels A or B in separate time intervals such that the channel pairs are repetitively cycled between their calibration and measurement modes. In addition, control logic 72 generates and applies the appropriate control signals over paths 79 and 77 to reset counters 74 and 76 at the beginning of each timing interval.

As control logic 72 cycles through its different states, it writes the value of its current state into an internal register (not shown) which is accessed by microprocessor 80 by a path 85. The microprocessor reads this value which, in turn, permits it to process the counted values provided by counter 74 and 76. Depending upon the mode in which each channel pair is operating, microprocessor 80 receives an interchannel phase difference measurement as well as a Δt value for each channel pair. Microprocessor 80 also applies appropriate signals onto paths 82 and 84 to control the operation of control logic element 72.

Microprocessor 80 is connected over path 91 to well-known output circuitry 90 which provides a number of standard outputs such as 4–20 MA output signals to path 263, and scaled frequency information over to path 262. Paths 263 and 262 together comprise a single output path 26 which extends to well-known circuitry (not shown) which utilizes the processed material information derived by the circuitry of FIG. 2.

Microprocessor 80 may comprise any well-known commercially available processor with sufficient random access memory 83 and a ROM 86. Inasmuch as its program utilizes an event-driven task architecture, a database is implemented within microprocessor 80 to facilitate easy transfer and sharing of the measurement and calculated data among the various tasks. The timing measurements containing the inter-channel phase differences and the Δt values for each pair of channels enables microprocessor 80 to correct the measured Δt values provided by each channel pair to account for the measured internal phase delay between a pair of currently active channels.

The presence of the multi-pole filter in each channel greatly enhances the signal processing capabilities of the circuitry of FIG. 2. The reason for this is that the presence of the multi-pole filter in each channel provides a narrow band or a sharp cutoff filter that greatly reduces the amplitude of the noise signals that are present on conductors 165L and 165R. Heretofore, prior to the utilization of the multi-pole filter in the channels in accordance with my invention, the operational sensitivity of the meter was limited by the amplitude of the noise signals. The integrating amplifiers, such as 46, in each channel were of little help with regard to this problem since they are a single-pole filter having a 6 dB/octave attenuation. This 6 dB/octave attenuation was inadequate to remove the noise signals that are immediately adjacent the frequency of the sensor signals. The addition of the multi-pole filters ahead of the integrating amplifiers solves this noise problem by providing a sharp cutoff and steep attenuation for received noise signals immediately adjacent the frequency of the sensor output signals. The use of these multi-pole filters thereby greatly reduces the amplitude of the noise signals on the input conductors of the integrating amplifiers and, in turn, to the inputs of the level detectors 48, 58 and 68. Since the input of the level detectors is substantially free of noise, they may operate with improved precision to determine the time delays between the sensor output signals where these time delays are far smaller in magnitude than could heretofore be processed.

The integrating amplifiers are still required, both as post filter elements, as well as dc eliminators to remove any dc offset that may be present on the outputs of the multi-pole filters.

Reference is made to the aforementioned Zolock U.S. Pat. No. 5,231,884 for further information regarding the operation of the circuitry of FIG. 2 including a processing program used to control the operations of microprocessor 80. Reference is also made to the aforementioned U.S. Pat. No. 5,228,327 to Bruck for further information regarding the operation of microprocessor 80 and its associated elements.

It is expressly understood that the claimed invention is not to be limited to the description of the preferred embodiment but encompasses other modifications and alterations within the scope and spirit of the inventive concept. For example, the invention has been described in conjunction with the flowmeter of FIG. 1. It is to be understood the invention is not limited in its application to flowmeters of the type shown in FIG. 1. It may be used with any type of flowmeter that operates on the Coriolis principle, including those having single tubes, double tubes, straight tubes, tubes of irregular configuration, etc. Also, the flowmeter with which the invention is utilized need not have the specific flange and hole configuration shown on FIG. 1 and, instead, may be mounted by any suitable means to the conduit to which the flowmeter is connected. The multi-pole filters 41, 51 and 61 of FIG. 2 have been described as being of the low-pass sharp cut-off type. This is not a limitation. These filters may, if desired, comprise a pseudo band-pass filter which has the same sharp cut-off, but also possesses filtering capabilities below the band-pass center frequency of the sensor output signals. This filter removes noise not only above but below the flow tube resonance frequency and thereby improves accuracy, signal-to-noise ratio, etc. Since this filter is of the narrow band type, it can track the flow tube frequency which varies with density and mass flow rate. Pseudo band pass filters of this type are well known in the art and therefore need not be described in further detail.

I claim:

1. Signal processing apparatus for determining the phase difference between two received input signals; said signal processing apparatus comprising:

a first channel and a second channel;

a multi-pole filter having a phase shift in each of said first and second channels connected to extend signals received on an input of each of said first and second channels to an output of each of said first and second channels;

means for applying a first one of said input signals to said input of said first channel;

switching means for controllably connecting said input of said second channel to said input of said first channel for the reception of said first one input signal during an nth time interval and, during an nth +1 time interval, for disconnecting said input of said second channel from said input of said first channel and applying a second one of said input signals to said input of said second channel;

means effective during said nth time interval for deriving a first correction factor representing the phase difference between output signals generated by said first and second channels in response to said application of said first input signal to said input of said first and second channels;

means effective during said nth +1 time interval for measuring the phase difference between output signals of said first and second input channels; and means for deriving a corrected phase difference between said first and second input signals by combining said first correction factor with said phase difference measured between said output signals of said first and second channels during said nth +1 time interval.

2. The signal processing apparatus of claim 1 wherein said signal processing apparatus further comprises:

a third channel;

a multi-pole filter having a phase shift in said third channel connected to extend signals received on an input of said third channel to an output of said third channel;

means including said switching means effective during an nth −1 time interval for connecting said input of said third channel to said input of said first channel for the reception of said first input signal by both said first and third channels;

means effective during said nth −1 time interval for generating a second correction factor representing the phase difference between output signals of said first and third channels; and means including said switching means effective during said nth time interval for disconnecting said input of said third channel from said first input signal and for connecting said input of said third channel to said second input signal;

means effective during said nth time interval for measuring the phase difference between output signals of said first and third channels; and means responsive to said measurement of said phase difference between said output signals of said first and third channels during said nth time interval for combining said second correction factor with said measured phase difference between said output signals of said first and third channels to derive a corrected phase difference between said first and second input signals.

3. The signal processing apparatus of claim 2 wherein each of said channels further comprises:

an operational amplifier having an input connected to said output of said multi-pole filter; said operational amplifier being effective for cancelling any DC offset from a signal applied to its input from said output of said multi-pole filter;

a level detector;

said output of said operational amplifier applying an AC signal having no DC offset to an input of said level detector;

said level detector being responsive to the receipt of a signal on its input for generating an output signal representing said signal applied to said input of said channel; and wherein said signal processing apparatus further comprises:
  a first counter connected to outputs of said first and second channels for generating an output representing the phase difference between signals on said outputs of said first and second channels;
  a second counter connected to outputs of said first and third channels for generating an output representing the phase difference between signals on said outputs of said first and third channels;
  said output of each of said counters representing the measured phase difference between said input signals of its associated channels in one of said time intervals and representing an interchannel phase correction factor for its associated channels during another one of said time intervals;
  a processor; and
  means for applying said output signals of said counters to said processor for the generation of said corrected phase difference between said received signals applied to said inputs of said channels associated with each counter.

4. The apparatus of claim 2 in combination with:
  a Coriolis flowmeter having process material flowing through vibrating flow tubes of said flowmeter;
  sensors coupled to said vibrating flow tubes for generating output signals representing the Coriolis movements of said vibrating flow tubes resulting from said flow of said process material;
  means connecting said sensors to said signal processing apparatus for applying said output signals to said signal processing apparatus as said received input signals; and
  wherein said signal processing apparatus further comprises means responsive to said derivation of said corrected phase difference between said input signals for determining information pertaining to said process material, 5. The apparatus of claim 4 wherein said Coriolis flowmeter includes a driver for vibrating said flow tubes; and
  wherein said apparatus further includes:
    a drive circuit having an output connected to said driver for applying an energizing signal to said driver; and
    means for applying an output of said operational amplifier of one of said channels as a filtered signal to said input of said drive circuit.

6. Signal processing apparatus for determining the phase difference between two received input signals; said signal processing apparatus comprising:
  a first channel and a second channel and a third channel;
  a multi-pole filter having a phase shift in each of said first and second and third channels connected to extend signals received on an input of each of said first and second and third channels to an output of each of said first and second and third channels;
  means for applying a first one of said input signals to an input of said first channel;
  means for connecting an input of said second channel to said input of said first channel for the reception of said first one input signal during an nth time interval;
  means effective during said nth time interval for deriving a first correction factor representing the phase difference between output signals generated by said first and second channels in response to the application of said first input signal to said inputs of said first and second channels;

means effective during an nth +1 time interval for disconnecting said input of said second channel from said input of said first channel and applying said second input signal to said input of said second channel;
  means effective during said nth +1 time interval for measuring the phase difference between output signals of said first and second channels; and
  means for deriving a corrected phase difference between said first and second input signals during said nth +1 time interval by combining said first correction factor with said measured phase difference between said output signals of said first and second channels;
  means effective during an nth −1 time interval for connecting an input of said third channel to said input of said first channel for the reception of said first input signal by said inputs of both said first and third channels;
  means effective during said nth −1 time interval for generating a second correction factor representing the phase difference between output signals of said first and third channels; and
  means effective during said nth time interval when said input of second channel is connected to said input of said first channel for connecting said input of said third channel to said second input signal;
  means effective during said nth time interval for measuring the phase difference between output signals of said first and third channels; and
  means responsive to said measurement of said phase difference between said output signals of said first and third channels during said nth time interval for combining said second correction factor with said measured phase difference between output signals of said first and third channels to derive a corrected phase difference between said first and second input signals.

7. A method of operating signal processing apparatus for determining the phase difference between two received input signals; said signal processing apparatus comprising:
  a first channel and a second channel and a third channel;
  a multi-pole filter having a phase shift in each of said first and second and third channels connected to extend input signals received on an input of each of said first and second and third channels to an output of each of said first and second and third channels;
  said method comprising the steps of:
    applying a first one of said input signals to an input of said first channel;
    connecting an input of said second channel to said input of said first channel for the reception of said first one input signal during an nth time interval;
    deriving a first correction factor representing the phase difference between output signals generated by said first and second channels in response to the application of said first input signal to said inputs of said first and second channels during said nth time interval;
    during an nth +1 time interval, disconnecting said input of said second channel from said input of said first channel and applying a second one of said input signals to said input of said second channel;
    measuring the phase difference between output signals of said first and second input channels during said nth +1 time interval; and deriving a corrected phase difference between said first and second input signals by combining said first correction factor with said measured phase difference between said output signal signals of said first and second channels;

connecting said input of said third channel to said input of said first channel for the reception of said first input signal by both said first and third channels during an nth −1 time interval;

generating a second correction factor representing the phase difference between output signals of said first and third channels during said nth −1 time interval; and connecting said input of said third channel to said second input signal during said nth time interval when said input of second channel is connected to said input of said first channel;

measuring the phase difference between output signals of said first and third channels during said nth time interval;

in response to said measurement of said phase difference between said output signals of said first and third channels during said nth time interval, combining said second correction factor with said measured phase difference between output signals of said first and third channels to derive a corrected phase difference between said first and second input signals.

8. A method of operating signal processing apparatus for determining the phase difference between two received input signals; said signal processing apparatus comprising:

a first channel and a second channel;

a multi-pole filter having a phase shift in each of said first and second channels connected to extend signals received on an input of each of said first and second channels to an output of each of said first and second channels;

said method comprising the steps of:

applying a first one of said input signals to an input of said first channel;

connecting an input of said second channel to said input of said first channel for the reception of said first one input signal during an nth time interval and disconnecting said input of said second channel from said input of said first channel during an nth +1 time interval and applying a second one of said input signals to said input of said second channel;

deriving a first correction factor representing the phase difference between output signals generated by said first and second channels in response to the application of said first input signal to said inputs of said first and second channels during said nth time interval;

measuring the phase difference between output signals of said first and second input channels during said nth +1 time interval; and deriving a corrected phase difference between said first and second input signals by combining said first correction factor with said measured phase difference between said output signal signals of said first and second channels.

9. The method of claim 8 wherein said signal processing apparatus further comprises:

a third channel;

a multi-pole filter having a phase shift in said third channel for extending signals received on an input of said third channel to an output of said third channel; and wherein said method further comprises the steps of:

connecting said input of said third channel to said input of said first channel for the reception of said first input signal by both said first and third channels during an nth −1 time interval;

generating a second correction factor representing the phase difference between output signals of said first and third channels during said nth −1 time interval; and disconnecting said input of said third channel from said input of said first channel and connecting said input of said third channel to said second input signal during said nth time interval when said input of second channel is connected to said input of said first channel;

measuring the phase difference between output signals of said first and third channels during said nth time interval;

in response to said measurement of said phase difference between said output signals of said first and third channels during said nth time interval, combining said second correction factor with said measured phase difference between output signals of said first and third channels to derive a corrected phase difference between said first and second input signals.

10. The method of claim 9 wherein said method comprises the further steps of:

operating an operational amplifier having an input connected to said output of said multi-pole filter; said operational amplifier being effective for cancelling any DC offset on its output from a signal applied to its input from said output of said multi-pole filter;

applying an AC signal having no DC offset from said output of said operational amplifier to an input of a level detector;

said level detector being responsive to the receipt of a signal on its input for generating an output signal representing said signal applied to said input of said channel; and operating a first counter connected to outputs of said first and second channels for generating an output representing the phase difference between signals on said outputs of said first and second channels;

operating a second counter connected to outputs of said first and third channels for generating an output representing the phase difference between signals on said outputs of said first and third channels;

said output of each of said counters representing the measured phase difference between input signals of its associated channels in one of said time intervals and said corrected phase difference between its associated channels during another one of said time intervals; and applying said output signals of said counters to a processor for the generation of information indicating said corrected phase difference between said received signals applied to said inputs of said channels.

11. The method of claim 9 in combination with:

a Coriolis flowmeter having process material flowing through vibrating flow tubes of said flowmeter;

said method further comprising the steps of:

coupling sensors to said flow tubes for generating output signals representing the Coriolis movements of said vibrating flow tubes resulting from said flow of said process material;

connecting said sensors to said signal processing apparatus for applying said output signals to said signal processing apparatus as said received input signals; and determining information pertaining to said process material in response to said derivation of said corrected phase difference between said input signals.

* * * * *